(12) United States Patent
Ikeda

(10) Patent No.: US 6,372,127 B1
(45) Date of Patent: Apr. 16, 2002

(54) SIMULATED MOVING BED SEPARATION SYSTEM

(75) Inventor: Hirokazu Ikeda, Arai (JP)

(73) Assignee: Daicel Chemical Industries, Ltd., Osaka-fu (JP)

( * ) Notice: Subject to any disclaimer, the term of this patent is extended or adjusted under 35 U.S.C. 154(b) by 0 days.

(21) Appl. No.: 09/522,071

(22) Filed: Mar. 9, 2000

(51) Int. Cl.$^7$ ............................................. B01D 15/00
(52) U.S. Cl. .................... 210/93; 210/264; 210/269; 210/284
(58) Field of Search ................. 210/673, 264, 210/269, 275, 284, 93

(56) References Cited

U.S. PATENT DOCUMENTS

| | | | |
|---|---|---|---|
| 4,511,476 A | 4/1985 | Schoenrock | 210/678 |
| 6,149,874 A | * 11/2000 | Hotier | 210/264 |

* cited by examiner

*Primary Examiner*—Ivars Cintins
(74) *Attorney, Agent, or Firm*—Birch, Stewart, Kolasch & Birch, LLP

(57) ABSTRACT

A simulated moving bed separation system is provided, in which a fluid circulation flow path can be washed for a short time. This system is provided with a circulation flow path having two or more packed beds connected in series and endlessly to each other, with desorbing-charging inlet, extract draw-out port, feedstock introducing port and raffinate draw-out port arranged in this order in the direction of flow of a circulation liquid, which are allowed to intermittently shift in the direction while being kept in this order, and with packed bed-washing pipes, valves and pumps. A desorbing liquid is introduced through the desorbing liquid introducing port into the circulation flow path. An extract rich in a strongly adsorptive constituent to be separated is drawn out through the extract draw-out port. A feedstock containing strongly and weakly adsorptive constituents is introduced through the feedstock introducing port into the circulation flow path, and a raffinate rich in a weakly adsorptive constituent is drawn out through the raffinate draw-out port.

4 Claims, 3 Drawing Sheets

SIMULATED MOVING BED SEPARATION SYSTEM

BACKGROUND OF THE INVENTION

1. Field of the Invention

This invention relates to a simulated moving bed separation system, more particularly a simulated moving bed separation system equipped with packed bed-washing means for washing the packed beds of the simulated moving bed separation system. Specifically, the simulated moving bed separation system of this invention can be washed for a shorter period of time than prior art simulated moving bed separation systems.

2. Prior Art

Known simulated moving bed separation systems comprise a flow path constituted by packed beds, each of which contains a separation filler packed therein, connected in series and endlessly via a piping to each other, a desorbing liquid introducing port for introducing the desorbing liquid into the flow path, an extract draw-out port for drawing out the extract rich in strongly adsorptive constituents of a feedstock from the flow path, a feedstock introducing port for introducing the feedstock containing constituents to be separated into the flow path, and a raffinate draw-out port for drawing out the raffinate rich in weakly adsorptive constituents of the feedstock from the flow path. The flow path is provided with a pump for forcibly circulating the liquids through the flow path. Further, the desorbing liquid introducing port, the extract draw-out port, the feedstock introducing port and the raffinate draw-out port are arranged in this order in the direction of flow of a liquid circulated through the flow path (hereunder referred to as "circulation liquid"), and designed to be intermittently shifted in the direction of flow while being kept in this order.

These simulated moving bed separation systems are featured in that these systems can continuously work, save an amount of the desorbing liquid used to a larger extent than batch-type chromatographic separation systems, and obtain an extract containing a high content of objectives. Thus, these systems have heretofore been used for separation or purification of drugs, pharmaceuticals, agrochemicals, perfumes, sucrose, etc.

These systems are in general cleaned by allowing a washing liquid such as a desorbing liquid to pass through the flow path when they are to be stopped working.

However, since the flow path for the circulation liquid comprises packed beds connected in series as mentioned, the pressure loss of the flow path is a total of all the pressure losses in the packed beds and piping. Accordingly, the total pressure loss of the flow path through which the circulation liquid is allowed to pass is very large. Thus, it is very difficult to allow the washing liquid to flow at a high speed through the flow path. Furthermore, since the washing liquid introduced into the flow path is allowed to pass all the packed beds and piping and thereafter discharged, it takes a very long period of time until the washing liquid is discharged after it is introduced. Thus, a very long period of time is required for washing of the flow path. These systems have such a further problem that impurities retained in one packed bed entrain on the circulated washing liquid to transfer to another packed bed, which is stained by the impurities.

SUMMARY OF THE INVENTION

One object of this invention is to provide a simulated moving bed separation system from which the above-mentioned problems of the prior art systems were eliminated.

Another object of this invention is to provide a simulated moving bed separation system, the flow path of which can be washed for a shorter period of time, and one packed bed of which is not stained by impurities retained in another packed bed.

The simulated moving bed separation system of this invention is as follows:

(1) a simulated moving bed separation system, which comprises a packed bed assembly consisting of a plurality of packed beds, each of which contains a filler packed therein, connected in series and endlessly to each other, and constituting part of a flow path through which liquid is forcibly circulated, provided with a desorbing liquid introducing port for introducing the desorbing liquid into the flow path, an extract draw-out port for drawing out an extract rich in strongly adsorptive constituents of a feedstock to be separated from the flow path, a feedstock introducing port for introducing the feedstock into the flow path, and a raffinate draw-out port for drawing out a raffinate rich in weakly adsorptive constituents of the feedstock from the flow path, wherein said desorbing liquid introducing port, said extract draw-out port, said feedstock introducing port and said raffinate draw-out port are arranged in this order in the direction of liquid circulation through the flow path, and designed to be intermittently shifted along the flow path while being kept in this order, and further provided with a packed bed-washing means for washing the packed beds by supplying a washing liquid into the packed beds at one end thereof, respectively; and (2) A simulated moving bed separation system according to (1) above, wherein said packed bed-washing means washes one unit consisting of one or two of the packed beds at one time, and switches from one to another unit at a predetermined interval to repeat the washing of the units of packed beds.

Figure 1:
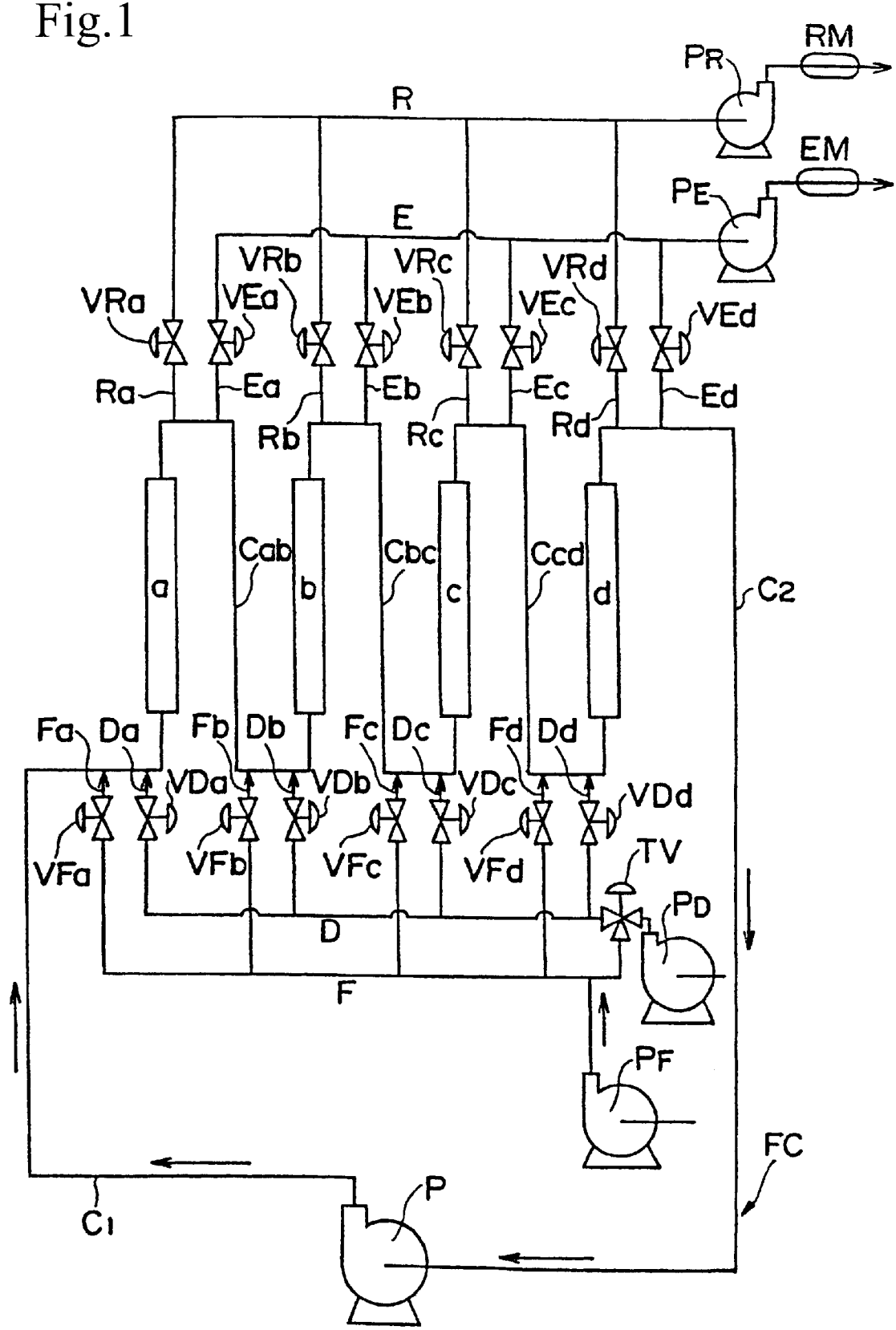
FIG. 1 is a piping diagram showing an embodiment of the simulated moving bed separation system according to this invention.

DESCRIPTION OF REFERENCE NUMERALS a to b . . . columns, Cab, Cbc, Ccd, $C_1$ and $C_2$ . . . pipes, FC . . . circulation flow path, Da to Dd . . . desorbing liquid introducing lines, Ea to Ed . . . extract draw-out lines, Fa to Fd . . . feedstock introducing lines, Ra to Rd . . . raffinate draw-out lines, D . . . desorbing liquid supplying line, E . . . extract draw-out integrated line, F . . . feedstock supplying line, R . . . raffinate draw-out integrated line, $P_D$ . . . desorbing liquid supplying pump, $P_F$ . . . feedstock supplying pump, $P_E$ . . . extract draw-out pump, $P_R$ . . . raffinate draw-out pump, $RV_D$, $RV_F$, $RV_E$ and $RV_R$ . . . rotary valves, VDa to VDd, VEa to VEd, VFa to VFd, and VRa to VRd . . . on-off valves, TV . . . cross valves, EM . . . monitor for monitoring the concentration of strongly adsorptive constituents, RM . . . monitor for monitoring the concentration of weakly adsorptive constituents

DETAILED DESCRIPTION OF PREFERRED EMBODIMENTS OF THIS INVENTION

As mentioned above, the simulated moving bed separation system comprises:

(A)
- (a) a circulation flow path comprising two or more packed beds, each of which contain a separation filler packed therein, connected in series and endlessly, and allowing a circulation liquid to be forcibly circulated therethrough,
- (b) a desorbing liquid introducing port for introducing the desorbing liquid into the circulation flow path,
- (c) an extract draw-out port for drawing out a circulation liquid rich in strongly adsorptive constituents (hereinunder referred to as "extracts") from the circulation flow path,
- (d) a feedstock introducing port for introducing the feedstock containing constituents to be separated into the circulation flow path, and
- (e) a raffinate draw-out port for drawing out a circulation liquid rich in weakly adsorptive constituents (hereinunder referred to as "raffinate") from the circulation flow path; and in which (B) the desorbing liquid introducing port, extract draw-out port, feedstock introducing port, and raffinate draw-out port are:

arranged in the order described above, and designed to be intermittently shifted while being kept in this order, and further (C) a packed bed washing means is provided, by which the system is washed by supplying a washing liquid for cleaning the inside of the beds into each of the beds at one end thereof, respectively.

Of the constituents contained in the feedstock, the strongly adsorptive constituents are relatively easily adsorbed onto the filler, on the other hand, the weakly adsorptive constituents are relatively hardly adsorbed on the filler.

Elements of this Invention

1. Circulation Flow Path

The simulated moving bed separation system has a circulation flow path formed therein by connecting two or more packed beds in series and endlessly, through which a circulation liquid is allowed to flow forcibly in one direction.

For example, the circulation flow path may be formed by endlessly connecting the packed beds in series via pipes.

The circulation flow path may be provided with a means for forcibly circulating a fluid therein in one direction.

The means for forcibly circulating a fluid may be of any structure or type whichever can forcibly circulate a fluid in one direction in the circulation flow path. For example, it may be a pump, which may be inserted into the circulation flow path. The kind of such a pump is not limited, but, practically, it may be a positive displacement pump such as a diaphragm pump and a plunger pump, or a turbo pump such as a centrifugal pump. Of these pumps is preferred the positive displacement pump, because it is featured in that no back-flow occurs owing to the valves provided at both the discharge and charge ends thereof, a high pressure can easily be applied thereto, and a fluid can be circulated in an accurate flow rate. The diaphragm pump is particularly preferred, because the circulation liquid is not in direct contact with wear parts such as a piston and plunger and hence the liquid is not stained. In the case where the centrifugal pump is used, the back-flow of the circulation liquid must be avoided by providing a check valve at a proximity of the discharge outlet thereof.

Alternatively, the means for forcibly circulating a fluid may be provided with pressure-regulating valves which are combined to regulate a pressure balance in the circulation flow path to thereby circulate the liquid in one direction.

The circulation flow path is provided with a desorbing liquid introducing port for introducing the desorbing liquid into the circulation flow path, extract draw-out port for drawing out a circulation liquid or extract rich in the strongly adsorptive constituents from the circulation flow path, feedstock introducing port for introducing a mixture or feedstock containing the constituents to be separated into the circulation flow path, and raffinate draw-out port for drawing out a circulation liquid or raffinate rich in the weakly adsorptive constituents from the circulation flow path, arranged in this order.

These ports are provided so that they can be switched, while being kept in the order above, to move or shift in the direction of circulation flow. A means for switching of these ports may be include a rotary valve or on-off valve. The on-off valve is a valve which is driven in accordance with an on-off control. The on-off valve may be a pneumatically driven valve, which can be opened or closed with an air pressure, on-off valve, or electrically driven valve. The switching means may be regulated by a microcomputer, personal computer or minicomputer, to conduct the switching at a predetermined interval.

The extract draw-out port and raffinate draw-out port may be provided with a flow rate-regulating valve or pressure-regulating valve to regulate the amounts of the extract and raffinate drawn out. Furthermore, a pump of a discharge-variable type may be used to draw out a predetermined amount. Still further, the amounts of the desorbing liquid and feedstock introduced into the circulation flow path can be regulated by the pumps of the same discharge-variable type by connecting these pumps to the desorbing liquid introducing port and feedstock introducing port, respectively. Alternatively, each of these inlets may be provided with a pump of a volume-fixed type and a throttle valve in place of the pump of a discharge-variable type.

In the circulation flow path, desorbing zone IV is formed in the packed beds between the desorbing liquid introducing port and the extract draw-out port, concentrating zone III in the packed beds between the extract draw-out port and the feedstock introducing port, refining zone II in the packed beds between the feedstock introducing port and the raffinate draw-out port, and adsorbing zone I in the packed beds between the raffinate draw-out port and the desorbing liquid introducing port.

In desorbing zone IV, the desorbing liquid introduced through the desorbing liquid introducing port is circulated. When the desorbing liquid is brought into contact with the separation filler, the strongly adsorptive constituent adhered on the filler is desorbed from the filler, so that the strongly adsorptive constituent in the extract is removed out at the extract draw-out port. The concentration of the strongly adsorptive constituent in the circulation liquid immediately after the desorbing liquid introducing port is near zero (0), while it increases in the direction of circulation flow in desorbing zone IV.

In concentrating zone III, the strongly adsorptive constituent in the circulation liquid is adsorbed onto the separation filler, and instead the weakly adsorptive constituent is desorbed from the separation filler.

In refining zone II, the strongly adsorptive constituent and weakly adsorptive constituent in the feedstock introduced at the feedstock introducing port are separated due to the difference in the degree of adsorption to the filler. The concentration of the strongly adsorptive constituent in the circulation liquid is reduced to approach zero (0) in the zone between the feedstock introducing port and the raffinate draw-out port, and the raffinate containing the weakly adsorptive constituent is then removed out at the raffinate draw-out port.

In adsorbing zone I, the weakly adsorptive constituent is adsorbed onto the separation filler, thus the concentration of the weakly adsorptive constituent in the circulation liquid is reduced to approach zero (0). Accordingly, the circulation liquid substantially free of the weakly adsorptive constituent and strongly adsorptive constituent, i.e., of the desorbing liquid only, is discharged from adsorbing zone I and again introduced into desorbing zone IV.

The desorbing liquid introducing port, extract draw-out port, feedstock introducing port and raffinate draw-out port are switched at a predetermined interval of time, whereby these zone are shifted over the circulation flow path.

2. Packed Beds

The number of the packed beds included in the circulation flow path is not limited as far as it is two or more. However, since the desorbing zone, concentrating zone, refining zone and adsorbing zone should be formed, the number are preferably 4, 6, 8, 10, 12 or 24.

The packed beds forming the circulation flow path include, for example, columns in which the separation filler is packed.

2.1 Separation Filler

The columns are packed with the separation filler on which the constituents to be separated can be adsorbed.

The separation filler includes a normal phase chromatographic filler or reversed-phase chromatographic filler.

Various known isomer-separation fillers may be used, and these fillers vary depending on the constituents to be separated.

For separation of optical isomers, for example, may be used an optical resolution filler utilizing an optically active polymer, or a low-molecular weight compound having an optical resolution. For the optical resolution filler utilizing the optically active high polymer, reference may be made to, for example, a carrier such as silica gel having a polysaccharide derivative such as an ester or carbamate of cellulose or amylose, polyacrylate derivative, or polyamide derivative supported thereon. Alternatively, the polymer not supported on the carrier may be used in a bead form, or a filler of a cross-linked type obtained by cross-linking the polymer may be used. Furthermore, for the optical resolution filler above, reference may be made to, for example, an inorganic carrier, such as silica gel, alumina, zirconia, titania, silicates or diatomaceous earth, or an organic carrier, such as polyurethane, polystyrene or polyacrylate derivative, having a low molecular weight compound having optical resolution, such as amino acids or derivatives thereof, crown ether or derivatives thereof, or cyclodextrin or derivative thereof, supported thereon.

The optical resolution fillers are commercially available, for example, preferably may be as follows: CHIRALCEL OB, CHIRALCEL OD, CROWNPAK CR(+), CHIRALCEL CA-1, CHIRALCEL OA, CHIRALCEL OK, CHIRALCEL OJ, CHIRALCEL OC, CHIRALCEL OF, CHIRALCEL OG, CHIRALCEL WH, CHIRALPAK WM, CHIRALPAK WE, CHIRALPAK OT(+), CHIRALPAK OP(+), CHIRALPAK AS, CHIRALPAK AD, CHIRALCEL OJ-R, and CHIRALCEL OD-R, all of which are trademarks of Daicel Chemical Industries, Ltd.

In the case where an isomeric saccharide including oligosaccharides is to be separated into fructose and glucose, the separation filler may be an ion-exchange resin of an alkaline earth metal (calcium, barium or strontium) salt-type for strong acids, or a crystalline aluminosilicate such as zeolite Y in which the exchangeable cations are replaced with ammonium, sodium, potassium, calcium, strontium or barium.

In the case where a fatty acid and triglyceride are to be separated from each other, a preferred separation filler may be a basic ion-exchange rein having a copolymer of styrene and divinyl benzene as a skeleton. For example, a weakly basic ion-exchange resin, such as Amberlite IRA93 made by Rohm and Haas or Duolite A377 made by Sumitomo Chemical Co., Ltd., or a strongly basic ion-exchange resin, such as Amberlite IRA400 made by Rohm and Haas or Duolite A161 made by Sumitomo Chemical Co., Ltd., is commercially available.

The average particle size of the separation filler packed in the columns varies depending upon the kind of the constituents to be separated and the flow rate of a medium passing through each of the columns. It is normally 1–300 $\mu$m, preferably 2–100 $\mu$m. If the pressure loss in the columns is to be kept at a low level, then the average particle size should desirably be adjusted to 10–100 $\mu$m. If the average particle size is within the range mentioned above, the pressure loss can be reduced, for example, down to at most 50 kgf/cm$^2$. On the other hand, the larger the average particle size becomes, the smaller the number of the theoretical adsorption plates. Therefore, in order to secure the practical number of the theoretical adsorption plates, the average particle size of the separation filler is normally 15–75 $\mu$m.

3. Desorbing Liquid

For the desorbing liquid supplied to the circulation flow path, reference may be made to, for example, an alcohol such as methanol, ethanol or ispropanol, a ketone such as acetone, methylethyl ketone or cyclohexanone, an ester such as ethyl acetate, methyl acetate or ethyl acetate or ethyl butyrate, a hydrocarbon such as pentane, hexane, isohexane, cyclohexane or heptane, an ether such as diethyl ether, dibutyl ether or diisopropyl ether, a carboxylic acid such as formic acid or acetic acid, tri-fluoro-acetic acid, an aromatic hydrocarbon such as benzene, alkyl benzene or toluene, a halogenated hydrocarbon such as monochlorobenzene or dichlorobenzene, an amide such as dimethyl formamide, a nitrile such as acetonitrile or butyronitrile, a pyrrolidone such as N-methyl pyrrolidone, water and buffering solutions. Furthermore, mixtures of various organic mediums such as the alcohols, ketones and hydrocarbons, and mixtures of organic mediums compatible with water, such as methanol, acetone, acetonitrile, dimethyl formamide or N-methyl pyrrolidone with water and/or buffering solutions, may be used for the desorbing liquid.

This desorbing liquid may be used as a normal moving phase or reversed moving phase. The preferred desorbing liquid varies depending upon a kind of the constituents to be separated. Furthermore, the desorbing liquid may contain as additives a basic substance such as diethyl amine or an acidic substance such as acetic acid, which improves the separation.

4. Feedstock

The feedstock supplied to the circulation flow path may be a di- or multi-constituent mixture of solutes to be separated, but not particularly limited. It may include various compounds such as drugs or pharmaceuticals, agrochemicals, foodstuff, feeding stuff, perfumes, etc., for example, a pharmaceutical such as thalidomide, a phosphorous agrochemical such as EPN, a synthetic flavoring matter such as monosodium glutamate, or a perfume such as menthol. Additionally, reference may be made to optically active alcohols, amines, amides or esters.

The above-mentioned mixtures of solutes may be, for example, mixtures of optical isomers or position isomers, or mixtures of substances required or not required, from some viewpoint, to be separated.

In order to separate a desired constituent from the multi-constituent mixture in the simulated moving bed separation system of this invention, the mixture is firstly divided into two groups: one group containing the desired constituent and the other group free of the desired constituent, then the first group is divided into two smaller groups: one smaller group containing the desired constituent and the other smaller group free of the desired constituent, and the groups containing the desired constituent are repeatedly divided into two smaller groups at predetermined times. Thus, the desired constituent can be separated.

A desired constituent can also be obtained from the multi-constituent mixture by both a batch-type separation system utilizing an operation such as crystallization, membrane separation, batch-type chromatography or distillation and the simulated moving bed separation system of this invention.

5. Packed Bed-Washing Means

In the simulated moving bed separation system of this invention, the packed bed-washing means can wash the packed beds by introducing a washing liquid into a series of the packed beds from one end thereof. The washing liquid should desorb strongly adsorptive constituents, weakly adsorptive constituents and impurities from the separation fillers, but should not be strongly adsorbed on the separation filler and denature the separation filler and desorbing liquid. Otherwise, any washing liquid may be used.

Accordingly, the washing liquid may be, for example, an alcohol such as methanol, ethanol or isopropanol, a ketone such as acetone, methylethyl ketone or cyclohexanone, an ester such as ethyl acetate, methyl acetate, ethyl acetate or ethyl butyrate, a hydrocarbon such as pentane, hexane or heptane, an ether such as diethyl ether, dibutyl ether or diisopropyl ether, a carboxylic acid such as formic acid or acetic acid, an aromatic hydrocarbon such as benzene, an alkyl benzene or toluene, a halogenated hydrocarbon such as monochlorobenzene or dichlorobenzene, an amide such as dimethyl formamide, a nitrile such as acetonitrile or butyronitrile, a pyrrolidone such as N-methyl pyrrolidone, water and buffering solutions. Furthermore, mixtures of various organic mediums such as the alcohols, ketones and hydrocarbons, and mixtures of organic mediums compatible with water, such as methanol, acetone, acetonitrile, dimethyl formamide or N-methyl pyrrolidone with water and/or buffering solutions, may be used for the desorbing liquid. Still further, the washing liquid may include an anionic, cationic or nonionic surfactant. Of these washing liquids, the liquid which is the same as the desorbing liquid is most preferred.

The packed bed washing means may be provided with a washing liquid injecting means at the inlet side of the packed bed, a washing liquid discharging means at the outlet side of the packed bed, and a washing liquid supplying means for supplying the washing liquid to the washing liquid injecting means.

The washing liquid injecting means and washing liquid discharging means may be a washing liquid injecting pipe, which is connected to the inlet side of the packed bed, and a washing liquid discharging pipe, which is connected to the outlet side of the packed bed, respectively. The washing liquid injecting pipe and washing liquid discharging pipe are provided with on-off valves, respectively. These on-off valves can be regulated by the regulator which controls the switching means for switching the desorbing liquid introducing port, in such a manner, for example, that they are closed when the simulated moving bed separation system is under the condition for separation/refining of the constituents (hereunder referred to as "separation/refining mode"), and opened when the system is under the condition for washing the packed beds (hereunder referred to as "washing mode").

In the separation/refining mode, the desorbing liquid introducing port, extract draw-out port, feedstock introducing port and raffinate draw-out port are successively shifted, while the circulation of the liquid through the circulation flow path allows the strongly and weakly adsorptive constituents to be separated from each other. On the other hand, in the washing mode, the shifting of these ports and the circulation are stopped.

Switching from the separation/refining mode to the washing mode may be manually made by an operator. Furthermore, after the simulated moving bed separation system is operated in the separation/refining mode for a predetermined period of time, this mode is switched to the washing mode. After the washing mode is continued for a predetermined period of time, this mode is again returned to the separation/washing mode. Such operation may be repeated. Still further, the washing liquid discharging pipe may be provided with a monitor for continuously measuring the concentrations of the strongly and weakly adsorptive constituents in the washing liquid removed through the washing liquid discharging pipe. Thus, in the washing mode, if the monitor finds that the concentrations of the strongly and weakly adsorptive constituents were lower than the predetermined levels, then the washing mode may be automatically switched to return to the separation/refining mode.

In the washing mode, the regulator may control the system in such a manner that the washing liquid injecting pipes and washing liquid discharging pipes all are opened, whereby the packed beds all may be washed at one time. Alternatively, the on-off valves may be regulated in such a manner that a pair of the washing liquid injecting pipe and washing liquid discharging pipe, or two or more pairs of these pipes may be opened, thereby washing each or a plurality of the packed beds.

In one embodiment of the simulated moving bed separation system of this invention, in which the desorbing liquid introducing port and feedstock introducing port are provided at the inlet side of each of the packed beds, and the extract draw-out port and raffinate draw-out port provided at the outlet side of each of the packed beds, the former two ports are used for the washing liquid injecting means, whereas the latter two ports are used for the washing liquid discharging means, in the washing mode.

For the washing liquid supplying means may be used various pumps, for example, a positive displacement pump such as a diaphragm pump or plunger pump, or a turbo-type pump such as a centrifugal pump. Of these pumps, the diaphragm pump is most preferred, because it can easily be used at a high pressure, and hardly stained with the washing liquid.

Alternatively, the washing liquid supplying means may be a washing liquid tank, which can press out the washing liquid with a compressed gas.

EXAMPLES

Embodiments of this invention will be illustrated below with reference to the drawings.

FIG. 1 is a piping diagram showing an embodiment of the simulated moving bed separation system according to this invention.

The simulated moving bed separation system of this invention shown in FIG. 1 is provided with four columns a, b, c and d connected in series and endlessly to each other, and pump P for circulating the circulation liquid through the columns a to d.

Columns a to d are filled with the separation filler.

The outlet side of column a is connected to the inlet side of column b via pipe Cab, the outlet side of column b connected to the inlet side of column c via pipe Cbc, and the outlet side of column c connected to the inlet side of column d via pipe Ccd. The outlet side of column d is connected to the suction side of pump P via pipe $C_2$ and the discharge side of pump P connected to the column a via pipe $C_1$. Thus, columns a to d, pipes $C_1$, $C_2$, Cab, Cbc and Ccd are integrated to form circulation flow path FC. The circulation liquid flows in the direction of arrow shown in FIG. 1 by action of pump P through circulation flow path FC.

The respective parts of the pipes in close proximity of the inlets of columns a to d are connected with feedstock introducing lines Fa to Fd, respectively, and to desorbing liquid introducing lines Da to Dd, respectively. The former lines introduce the feedstock and the latter lines the desorbing liquid into circulation flow path FC.

On the other hand, the respective parts of the pipes in close proximity of the outlets of columns a to d are connected to extract draw-out lines Ea to Ed, respectively, and to raffinate draw-out lines Ra to Rd, respectively. The former lines draw out the extract and the latter lines the raffinate from circulation flow path FC.

The desorbing liquid introducing lines Da to Dd, and feedstock introducing lines Fa to Fd are connected to desorbing liquid-supplying line D through which the desorbing liquid is supplied to desorbing liquid introducing lines Da to Dd, and to feedstock supplying line F through which the feedstock introducing lines Fa to Fd, respectively. One end of the desorbing liquid supplying line D is connected to desorbing liquid pump $P_D$, and feedstock-supplying line F connected at one end thereof to feedstock pump $P_F$.

On-off valves VDa to VDd are inserted into desorbing liquid introducing lines Da to Dd at the downstream of desorbing liquid supplying line D. On-off valves VFa to VFd are inserted into feedstock introducing lines Fa to Fd at the downstream of feedstock supplying line F.

On the other hand, on-off valves VEa to VEd are inserted into extract draw-out lines Ea to Ed, respectively, which are integrated in extract draw-out integrated line E, which is connected with extract draw-out pump $P_E$. On-off valves VRa to VRd are inserted into raffinate draw-out lines Ra to Rd, respectively, which are integrated in raffinate draw-out integrated line R. which is connected to raffinate draw-out pump $P_R$. Extract draw-out integrated line E is provided with monitor EM for monitoring the concentration of strongly adsorptive constituents, and raffinate draw-out integrated line R provided with monitor RM for monitoring the concentration of weakly adsorptive constituents. At least one of extract draw-out pump $P_E$ and raffinate draw-out pump $P_R$ may be replaced with a pressure-regulating valve. Furthermore, only one of the two monitors above may be provided.

On-off valves VFa to VFd, VDa to VDd, VFa to VFd and VRa to VRd are opened or closed by means of commands from a regulator (not shown). To the regulator are connected monitors EM and RM.

In the simulated moving bed separation system as shown in FIG. 1, columns a to d correspond to the packed beds referred to in this invention. Circulation flow path FC corresponds to the fluid circulation flow path referred to in this invention. Desorbing liquid introducing lines Da to Dd correspond to the desorbing liquid introducing ports referred to in this invention. Extract draw-out lines Ea to Ed correspond to the extract draw-out ports referred to in this invention. Feedstock introducing lines Fa to Fd correspond to the feedstock introducing ports referred to in this invention. Raffinate draw-out lines Ra to Rd correspond to the raffinate draw-out ports referred to in this invention. When the simulated moving bed separation system is in the washing mode, on-off valves VDa to VDd serve as a washing liquid injecting means, and on-off valves VEa to VEd as a washing liquid discharging means. Desorbing liquid pump $P_D$ serves as a washing liquid supplying means.

The function of the simulated moving bed separation system of this invention will be illustrated below with reference to FIG. 1.

When a desired constituent is to be separated and refined from the feedstock containing a plurality of constituents by the simulated moving bed separation system of this invention, on-off valves VDa to VDd, VEa to VEd, VFa to VFd and VRa to VRd are regulated by the regulator mentioned above, so that one of desorbing liquid introducing lines Da to Dd, one of extract draw-out lines Ea to Ed, one of feedstock introducing lines Fa to Fd, and one of raffinate draw-out lines Ra to Rd may be connected to circulation flow path FC, in the order of the desorbing liquid introducing line, extract draw-out line, feedstock introducing line and raffinate draw-out line in the direction of circulation liquid flow through circulation flow path FC.

For example, on-off valves VDa, VEa, VFc and VRc are opened, and the other valves all closed, so that desorbing liquid introducing line Da, extract draw-out line Ea, feedstock introducing line Fc and raffinate draw-out line Rc are connected to circulation flow path FC.

Thus, desorbing zone IV is formed in column a positioned between desorbing liquid introducing line Da and extract draw-out line Ea. and concentrating zone III formed in column b positioned between extract draw-out line Ea and feedstock introducing line Fc. Refining zone II is formed in column c positioned between feedstock introducing line Fc and raffinate draw-out line Rc, and adsorbing zone I is formed in column d positioned between raffinate draw-out line Rc and desorbing liquid introducing line Da.

In column a containing desorbing zone IV formed therein, the strongly adsorptive constituent adsorbed on the separation filler packed therein is desorbed by the desorbing liquid supplied to circulation flow path FC through feedstock introducing line Fa and the circulation liquid circulated through circulation flow path FC and free of the strongly and weakly adsorptive constituents. The strongly adsorptive constituent thus desorbed transfers into the circulation liquid. Therefore, the concentration of the strongly adsorptive constituent in the circulation liquid is approximately zero (0) near the inlet side of column a, whereas it increases as the circulation liquid proceeds in column a. The circulation liquid containing a large amount of the strongly adsorptive constituent is removed out of column a. Part of the circulation liquid from column a is drained as an extract through extract draw-out line Ea, and the remainder enters column b.

In column b containing concentrating zone III formed therein, the strongly adsorptive constituent in the circulation liquid is adsorbed onto the separation filler while the circulation liquid passes through column b. On the other hand, the weakly adsorptive constituent adsorbed in column b transfers into the circulation liquid. The circulation liquid removed from column b enters into column c together with the feedstock introduced through feedstock introducing line Fc.

In column c containing refining zone II formed therein, the strongly adsorptive constituent containing the feedstock and circulation liquid is adsorbed onto the separation filler, whereas the weakly adsorptive constituent adsorbed on the separation filler transfers into the circulation liquid. The circulation liquid containing a major amount of the weakly adsorptive constituent is removed out of column c. Part of the circulation liquid from column c is removed as a raffinate through raffinate draw-out line Rc, and the remainder enters into column d.

In column d containing adsorbing zone I formed therein, the high content of the weakly adsorptive constituent contained in the circulation liquid is adsorbed onto the separation filler, and the circulation liquid free of the strongly and weakly adsorptive constituents is removed out of column d. The circulation liquid from column d passes through pipe $C_2$, pump P, and pipe $C_1$ and returns to column a.

After a predetermined period of time elapses, the regulator controls the system so as to close on-off valves VDa, VEa, VFc and VRc and instead open on-off valves VDb, VEb, VFd and VRd, thereby switching desorbing liquid introducing line Da to desorbing liquid introducing line Db, extract draw-out line Ea to extract draw-out line Eb, feedstock introducing line Fc to feedstock introducing line Fd and raffinate draw-out line Rc to raffinate draw-out line Rd. This switching allows desorbing zone IV to shift from column a to column b, concentrating zone III to shift from column b to column c, refining zone II to shift from column c to column d, and adsorbing zone I to shift from column d to column a.

Thus, in column b, the strongly adsorptive constituent adsorbed on the separation filler is desorbed by the desorbing liquid supplied from desorbing liquid-supplying line D. Part of the circulation liquid removed from column b is drained as the extract through extract draw-out line Eb, and the remainder enters column c.

In column c, the strongly adsorptive constituent in the circulation liquid is adsorbed onto the separation filler, and the weakly adsorptive constituent adsorbed in column c transfer into the circulation liquid. Thus, the circulation liquid decreases in the concentration of the strongly adsorptive constituent and increases in the concentration of the weakly adsorptive constituent while passing through column c.

The circulation liquid discharged from column c enters column d together with the feedstock supplied through feedstock introducing line Fd. In column d, the strongly adsorptive constituent contained in the feedstock and circulation liquid is adsorbed onto the separation filler, whereas the weakly adsorptive constituent adsorbed on the separation filler transfers into the circulation liquid. Part of the circulation liquid removed from column d is drawn out as a raffinate through raffinate draw-out line Rd, and the remainder enters column a.

In column a, the weakly and strongly adsorptive constituents in the circulation liquid are adsorbed, whereby the circulation liquid free of the weakly and strongly adsorptive constituents is discharged from column a. The circulation liquid discharged from column a returns to column b.

After a further predetermined period of time elapses, the regulator controls the system so as to close on-off valves VDb, Veb, VFd and VRd and instead open on-off valves VDc, VEc, VFa and VRa, thereby switching desorbing liquid introducing line Db to desorbing liquid introducing line Dc, extract draw-out line Eb to extract draw-out line Ec, feedstock introducing line Fd to feedstock introducing line Fa and raffinate draw-out line Rd to raffinate draw-out line Ra. This switching allows desorbing zone IV to shift from column b to column c, concentrating zone III to shift from column c to column d, refining zone II to shift from column d to column a, and adsorbing zone I to shift from column a to column b.

In the separation/refining mode, as mentioned above, desorbing liquid introducing lines Da to Dd, extract draw-out lines Ea to Ed, feedstock introducing lines Fa to Fd and raffinate draw-out lines Ra to Rd are switched by on-off valves VDa to VDd, VEa to VEd, to VFa and VFd and VRa to VRd, whereby desorbing zone IV, concentrating zone III, refining zone II and adsorbing zone I are shifted over columns a to d.

In the washing mode, pumps P and $P_F$ are stopped. On-off valves VDa to VDd, and VEa to VEd or VRa to VRd all are opened, and desorbing liquid pump $P_D$ is started.

The desorbing liquid supplied from desorbing liquid pump $P_D$ passes through desorbing liquid introducing lines Da to Dd into columns a to d. Then, the desorbing liquid washes off the strongly and weakly adsorptive constituents and impurities retained in columns a to b, from columns a to b, and thereafter is discharged through extract draw-out lines Ea to Ed or raffinate draw-out lines Ra to Rd.

The packed beds are different from each other in the resistance to flow of the washing liquid. Therefore, the washing liquid may be prevented from passing through a packed bed having a higher resistance to flow when allowed to pass through all the packed beds at one time. In such a case, the packed beds may be separately washed.

For example, in a case where column a is washed, pumps P and $P_D$ are firstly stopped. Then, on-off valves VDa and VEa or VRa are opened, and the other are closed. Pump $P_D$ is started supplying the washing liquid through desorbing liquid supplying line D and desorbing liquid introducing line Da into column a, and allow the system to discharge the washing liquid through extract draw-out line Ea or raffinate draw-out line Ra.

The finish of washing of column a is judged by monitor EM for monitoring the concentration of the strongly adsorptive constituent and mounted in the extract draw-out integrated line E and monitor ER for monitoring the concentration of the weakly adsorptive constituent and mounted in the raffinate draw-out integrated line R.

Similarly, in a case where column b is washed, pumps P and PF are stopped. On-off valves VDb and VEb or VRb are opened, and the other valves are closed. Then, pump $P_D$ is started supplying the washing liquid through desorbing liquid-supplying line D and desorbing liquid introducing line Db into column b and allows the system to discharge the liquid through extract draw-out line Eb or raffinate draw-out line Rb.

Columns c and d can be washed in the same manner.

In the simulated moving bed separation system, the feedstock in a feedstock tank (not shown) may be replaced with the washing liquid, and the washing liquid may be supplied by pump $P_F$ in place of pump $P_D$ to the packed bed to be washed. Furthermore, desorbing liquid pump $P_D$ may be connected through a cross valve to feedstock supplying line F. Then, pump $P_D$ is started supplying the washing liquid through feedstock supplying line F to the column to be washed.

When either of monitors EM and RM finds that the concentration of the strongly adsorptive constituent or weakly adsorptive constituent is lower than the predetermined one, the simulated moving bed separation system as shown in FIG. 1 is automatically switched from the washing mode to the separation/refining mode.

Figure 2:
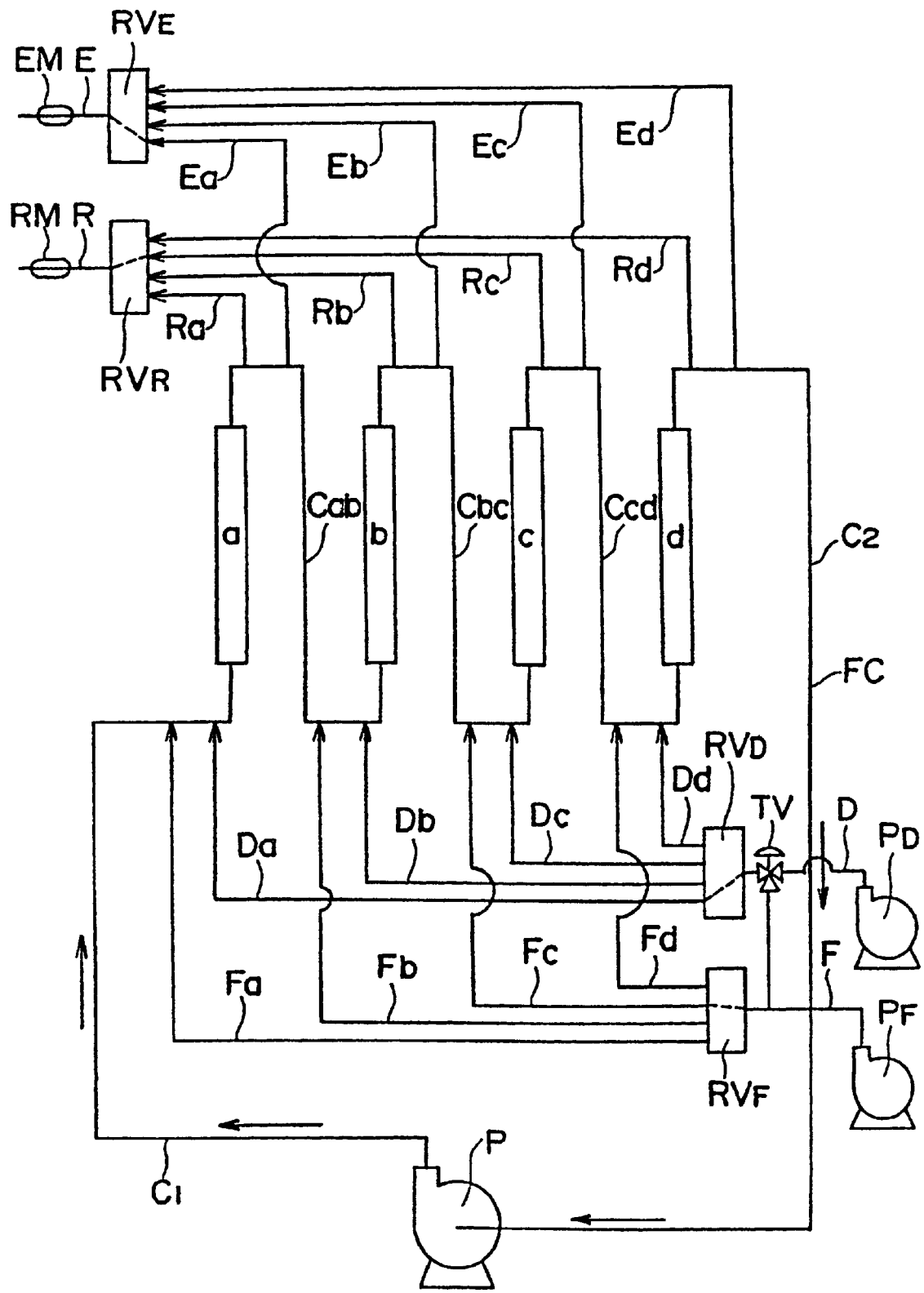
FIG. 2 is a piping diagram showing an embodiment of the simulated moving bed separation system as shown in FIG. 1, in which the desorbing liquid introducing line, extract draw-out line, feedstock introducing line and the raffinate draw-out line are switched by a rotary valve.

FIG. 2 is a piping diagram showing an embodiment of the simulated moving bed separation system as shown in FIG. 1, in which the desorbing liquid introducing line, extract draw-out line, feedstock introducing line and the raffinate draw-out line are switched by a rotary valve.

In the simulated moving bed separation system of FIG. 2, desorbing liquid introducing line Da to Dd and feedstock introducing lines Fa to Fd are connected to the inlet sides of columns a to d, respectively, in circulation flow path FC, and extract draw-out lines Ea to Ed and raffinate draw-out lines Ra to Rd are connected to the outlet sides of columns a to d, respectively. Monitor EM for monitoring the concentration of the strongly adsorptive constituent is mounted in extract draw-out line E, and monitor RM for monitoring the concentration of the weakly adsorptive constituent is mounted in raffinate draw-out line R.

Desorbing liquid introducing lines Da to Dd are connected via rotary valve $RV_D$ to desorbing liquid supplying line D, and feedstock introducing lines Fa to Fd connected via rotary valve $RV_F$ to feedstock supplying line F. Desorbing liquid supplying line D and feedstock supplying line F are connected to desorbing liquid pump $P_D$ and feedstock pump $P_F$, respectively, in the same manner as shown in FIG. 1. Rotary valve $RV_D$ has such a function that it permits selected one of desorbing liquid introducing lines Da to Dd to be open to desorbing liquid supplying line D, while it closes the other desorbing liquid introducing lines. Rotary valve $RV_F$ has such a function that it permits selected one of feedstock introducing lines Fa to Fd to be open to feedstock-supplying line F, while it closes the other feedstock introducing lines. Between rotary valve $RV_D$ and desorbing liquid pump $P_D$ there is provided cross valve TV, which is connected to feedstock-supplying line F.

Raffinate draw-out lines Ra to Rd are connected via rotary valve $RV_R$ to raffinate draw-out integrated line R, and extract draw-out lines Ea to Ed connected via rotary valve $RV_E$ to extract draw-out integrated line E. Rotary valve $RV_R$ has such a function that it permits selected one of raffinate draw-out lines Ra to Rd to be open to raffinate draw-out integrated line R, while it closes the other raffinate draw-out lines. Rotary valve $RV_E$ has such a function that it permits selected one of extract draw-out lines Ea to Ed to be open to extract draw-out integrated line E, while it closes the other extract draw-out lines. Rotary valves $RV_D$, $RV_E$, $RV_F$ and $RV_R$ are switched by a regulator (not shown).

In the simulated moving bed separation system as shown in FIG. 2, columns a to d correspond to the packed beds referred to in this invention, and circulation flow path FC to the fluid circulation flow path referred to in this invention. Desorbing liquid introducing lines Da to Dd correspond to the desorbing liquid introducing ports referred to in this invention, and extract draw-out lines Ea to Ed to the extract draw-out ports referred to in this invention. Feedstock introducing lines Fa to Fd correspond to the feedstock introducing ports referred to in this invention, and raffinate draw-out lines Ra to Rd to the raffinate draw-out ports referred to in this invention. When the simulated moving bed separation system as shown in FIG. 2 is in the washing mode, desorbing liquid supplying line D, desorbing liquid pump $P_D$, on-off valves VDa to VDd, on-off valves VEa to VEd, on-off valves VFa to VFd, on-off valves VRa to VRd, rotary valves $RV_D$, $RV_E$, $RV_F$ and $RV_R$, and cross valve TV serve as a packed bed washing means in the simulated moving bed separation system of this invention. In this case, desorbing liquid supplying line D, desorbing liquid pump $P_D$, on-off VDa to VDd, on-off valves VFa to VFd, rotary valves $RV_D$ and $RV_F$, and cross valve TV serve as the washing liquid injecting means in the simulated moving bed separation system of this invention. On-off valves VEa to VEd and on-off valves VRa to VRd, and rotary valves $RV_E$ and $RV_R$ serve as the washing liquid discharging means in the simulated moving bed separation system of this invention. Desorbing liquid pump $P_D$ serves as a washing liquid supplying means in the simulated moving bed separation system of this invention.

The function of the simulated moving bed separation system will be illustrated below with reference of FIG. 2.

In the separation/refining mode, rotary valves $RV_D$, $RV_F$, $RV_E$ and $RV_E$ are controlled by the regulator mentioned above, so that one of desorbing liquid introducing lines Da to Dd, one of extract draw-out lines Ea to Ed, one of feedstock introducing lines Fa to Fd, and one of raffinate draw-out lines Ra to Rd may be connected to circulation flow path FC, in the order of the desorbing liquid introducing line, extract draw-out line, feedstock introducing line and raffinate draw-out line in the direction of circulation liquid flow through circulation flow path FC.

For example, in FIG. 2, desorbing liquid introducing line Da and feedstock introducing line Fc are open to desorbing liquid supplying line D and feedstock supplying line F, respectively, by rotary valves $RV_D$ and $RV_F$, and desorbing liquid introducing lines Da to Dd and feedstock introducing lines Fa, Fb and Fd are closed. Extract draw-out line Ea and raffinate draw-out line Rc are open to extract draw-out integrated line E and raffinate draw-out integrated line R, respectively, by rotary valves $RV_E$ and $RV_R$, and extract draw-out lines Eb to Ed and raffinate draw-out lines Ra, Rb and Rd are closed.

Thus, desorbing zone IV, in which the strongly adsorptive constituent is desorbed, is formed in column a positioned between desorbing liquid introducing line Da and extract draw-out line Ea. Concentrating zone III, in which the strongly adsorptive constituent is adsorbed and the weakly adsorptive constituent is desorbed, is formed in column b positioned between extract draw-out line Ea and feedstock introducing line Fc. Refining zone II, in which the strongly adsorptive constituent in the feedstock is adsorbed and separated from the weakly adsorptive constituent, is formed in column c positioned between feedstock introducing line Fc and raffinate draw-out line Rc, and adsorbing zone I, in which the weakly adsorptive constituent in the circulation liquid is adsorbed, is formed in column d positioned between raffinate draw-out line Rc and desorbing liquid introducing line Da.

After a predetermined period of time elapsed, the regulator works to switch rotary valves $RV_D$, $RV_E$, $RV_F$ and $RV_R$.

This switching allows changes desorbing liquid introducing line Da to desorbing liquid introducing line Db, extract draw-out line Ea to extract draw-out line Eb, feedstock introducing line Fc to feedstock introducing line Fd, and raffinate draw-out Rc to raffinate draw-out line Rd, whereby desorbing zone IV is formed in column b, concentrating zone III in column c, refining zone II in column d, and adsorbing zone I in column a.

Thus, desorbing liquid introducing lines Da to Dd, extract draw-out lines Ea to Ed, feedstock introducing lines Fa to Fd and raffinate draw-out lines Ra to Rd are in turn switched by rotary valves $RV_D$, $RV_E$, $RV_F$ and $RV_R$, whereby desorbing zone IV, concentrating zone III, refining zone II and adsorbing zone I are shifted over columns a to d.

Figure 3:
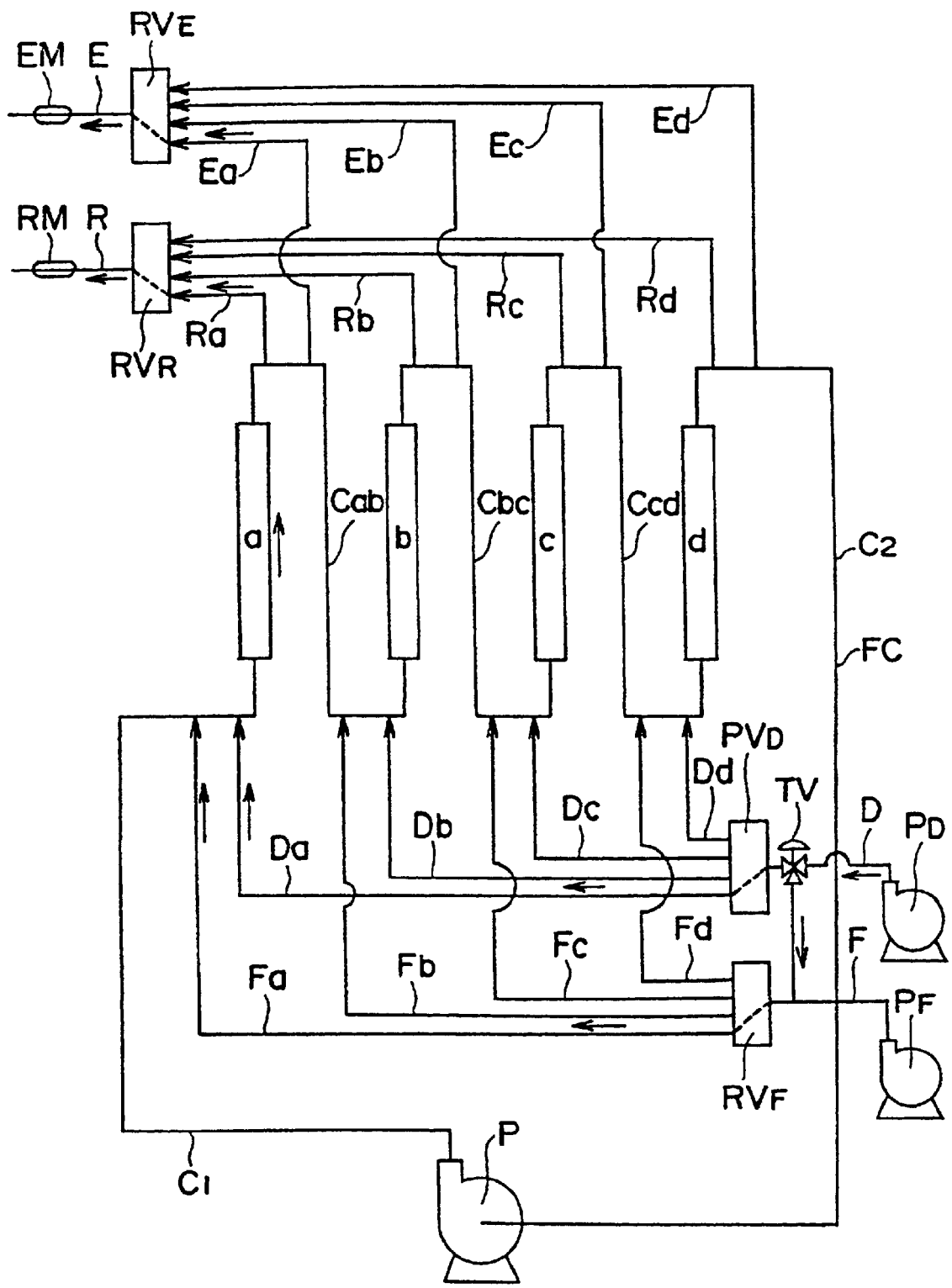
FIG. 3 is a piping diagram of the simulated moving bed separation system as shown in FIG. 2 under the column-washing condition.

The simulated moving bed separation system of FIG. 2 under the condition of the washing mode is shown in FIG. 3.

When the simulated moving bed separation system is in the washing mode, as shown in FIG. 3, pumps P and $P_F$ are stopped, whereby the flow of the circulation liquid through the circulation flow path FC is stopped.

Under this condition, in the case where column a is to be washed, rotary valves $RV_D$ and $RV_F$ are switched so that desorbing liquid supplying line D may be open to desorbing liquid introducing line Da, or desorbing liquid supplying line D open to feedstock introducing line Fa by switching cross valve TV, and rotary valves $RV_E$ and $RV_R$ are switched, so that extract draw-out integrated line E may be open to extract draw-out line Ea and raffinate draw-out integrated line R open to raffinate draw-out line Ra.

By starting pump $P_D$ under this condition, the desorbing liquid passes through desorbing liquid supplying line D and desorbing liquid introducing line Da, or desorbing liquid supplying line D, cross valve TV and feedstock introducing line Fa to enter column a. Thereafter, the desorbing liquid passes through extract draw-out line Ea or raffinate draw-out line Ra, and is discharged through extract draw-out integrated line E or raffinate draw-out integrated line R.

When monitor EM for monitoring the concentration of the strongly adsorptive constituent and monitor RM for monitoring the concentration of the weakly adsorptive constituent find that these concentrations are lower than the predetermined values, respectively, the regulator judges that the washing of column a has been finished, and switches rotary valves $RV_D$ and $RV_F$ to make desorbing liquid-supplying line D open to desorbing liquid introducing line Db, or switches cross valve TV to make desorbing liquid-supplying line D open to feedstock introducing line Fb. Furthermore, the regulator switches rotary valves $RV_E$ and $RV_R$ to make extract draw-out integrated line E open to extract draw-out line Eb, and make raffinate draw-out integrated line R open to raffinate draw-out line Rb. By starting pump $P_D$ under the condition, the desorbing liquid is allowed to pass through column, thus washing column b. When monitor EM for the strongly adsorptive constituent mounted in extract draw-out integrated line E or monitor RM for the weakly adsorptive constituent mounted in raffinate draw-out integrated line R finds that either of the concentrations of the strongly or weakly adsorptive constituents is lower than the predetermined value, the regulator judges that the washing of column b has been finished. Similarly, columns c and d are in turn washed.

Effects of the Invention

According to this invention, is provided the simulated moving bed separation system, in which the fluid circulation flow path can be washed for a short time. More particularly, the simulated moving bed separation system is provided, in which the packed beds forming the fluid circulation flow path all can be washed at one time, or only a packed bed needed to be washed can be washed.

In the simulated moving bed separation system of this invention, a plurality of packed beds are washed by connecting these packed beds in parallel and allowing a washing liquid such as a desorbing liquid to pass through these packed beds. Therefore, a pressure loss in washing is very low. Thus, the washing liquid is allowed to pass through the packed beds or fluid flow path at a high flow rate. This means that the washing can be carried out for a short time. Furthermore, the problem that impurities retained in one packed bed is circulated with the washing liquid through the fluid circulation flow path to stain the other packed beds can be eliminated.

The simulated moving bed separation system of this invention is provided with desorbing liquid introducing ports and feedstock introducing ports at the respective inlet sides of the packed beds, and with extract draw-out ports and raffinate draw-out ports at the respective outlet sides of the packed beds. The washing liquid is charged through the desorbing-charging inlet or feedstock introducing port, and discharged through the extract draw-out port or raffinate draw-out port. Therefore, the simulated moving bed separation system of this invention is characterized in that the packed beds as well as the feedstock introducing port, extract draw-out port and raffinate draw-out port can be washed.

What is claimed is:

1. A simulated moving bed separation system comprising a packed bed assembly having a plurality of packed beds, each containing a filler therein, packed bed washing means for washing each packed bed, said packed beds being connected in series to each other and having charging and discharging ends thereof connected to each other via a looped fluid passage to circulate fluid in a unidirectional direction;

wherein each packed bed in the system is consecutively fitted with a port for introducing a desorbing liquid, a port for drawing out a solution containing an extract, a port for introducing a feedstock fluid and a port for drawing out a solution containing a raffinate;

said desorbing liquid introducing port, extract draw-out port, feedstock introducing port and raffinate draw-out port can have their positions successively shifted in the unidirectional direction intermittently; and wherein said packed bed washing means comprises a washing liquid injecting means for injecting a washing liquid into said packed bed through said introducing end, washing liquid discharging means for discharging said washing liquid from said discharging end, and washing liquid feeding means for feeding said washing liquid to said washing liquid injecting means, the separation system further comprising:

a first rotary valve, a second rotary valve, a third rotary valve and a fourth rotary valve, said first rotary valve having a first inlet and a plurality of outlets, with each of said outlets being connected to a separate packed bed, whereby said first rotary valve is coupled with each of said packed beds, said first rotary valve being designed to supply said feedstock to any selected one of the packed beds in said packed bed assembly;

said second rotary valve having a first outlet and a plurality of inlets, with each of said inlets being connected to a separate packed bed, whereby said second rotary valve is coupled with each of said packed beds, said second rotary valve being designed to draw out said solution containing a raffinate from the packed bed positioned downstream of the packed bed to which said feedstock has been supplied;

said third rotary valve having a second inlet and a plurality of outlets, with each of said outlets being connected to a separate packed bed, whereby said third rotary valve is coupled with each of said packed beds, said third rotary valve being designed to supply said desorbing liquid to the packed bed positioned downstream of the packed bed from which said solution containing a raffinate has been drawn out; and said fourth rotary valve having a second outlet and a plurality of inlets, with each of said inlets being connected to a separate packed bed, whereby said fourth rotary valve is coupled with each of said packed beds, said fourth rotary valve being designed to select a packed bed to which said desorbing liquid has been supplied, and to draw out said solution containing an extract from said selected packed bed, wherein said first inlet serves for said desorbing liquid introducing port, said first outlet for said raffinate draw-out port, said second inlet for said feedstock introducing port and said second outlet for said extract draw-out port, and said first inlet, said first outlet, said second inlet and said second outlet are shifted in succession intermittently without changing this order by change-over operations of said first to fourth rotary valves.

2. The simulated moving bed separation system according to claim 1, further comprising a cross valve having a cross valve inlet, a first cross valve outlet and a second cross valve outlet, wherein said first cross valve outlet is connected with said inlet of said first rotary valve, said second cross valve outlet with said inlet of said third rotary valve, and said washing liquid is fed from said first cross valve inlet, whereby said washing liquid is fed into the packed beds through each of said first rotary valve and said third rotary valve by change-over of said cross valves.

3. A simulated moving bed separation system, which comprises:

a packed bed assembly having a plurality of packed beds, each of which contains a filler packed therein, connected in series and forming part of a looped fluid circulation flow path for forcibly circulating a liquid therethrough;

a desorbing liquid introducing port for introducing the desorbing liquid into the fluid circulation flow path;

an extract draw-out port for drawing out an extract of a feedstock to be separated from the fluid circulation flow path;

a feedstock introducing port for introducing the feedstock into the flow path, and raffinate draw-out port for drawing out a raffinate from the fluid circulation flow path, wherein said desorbing liquid introducing port, extract draw-out port, feedstock introducing port and raffinate draw-out port are consecutively arranged unidirectionally in the fluid circulation flow path, and can be intermittently shifted along the fluid circulation flow path while being kept consecutively arranged; and a packed bed-washing means including a pumping means for washing the packed beds by supplying a washing liquid into the packed beds at one end thereof, respectively, the simulated moving bed separation system further comprising a washing liquid discharge pipe, wherein the washing liquid discharge pipe is provided with a monitor for continuously measuring constituents in the washing liquid.

4. A simulated moving bed separation system comprising a packed bed assembly having a plurality of packed beds, each containing a filler therein, packed bed washing means for washing each packed bed, said packed beds being connected in series to each other and having charging and discharging ends thereof connected to each other via a looped fluid passage to circulate fluid in a unidirectional direction;

wherein each packed bed in the system is consecutively fitted with a port for introducing a desorbing liquid, a port for drawing out a solution containing an extract, a port for introducing a feedstock fluid and a port for drawing out a solution containing a raffinate;

said desorbing liquid introducing port, extract draw-out port, feedstock introducing port and raffinate draw-out port can have their positions successively shifted in the unidirectional direction intermittently; and wherein said packed bed washing means comprises a washing liquid injecting means for injecting a washing liquid into said packed bed through said introducing end, washing liquid discharging means for discharging said liquid from said discharging end, and washing liquid feeding means for feeding said washing liquid to said washing liquid injecting means, wherein the washing liquid discharging means comprises a washing liquid discharge pipe and the washing liquid discharge pipe is provided with a monitor for continuously measuring constituents in the washing liquid.

* * * * *